(No Model.)
T. ROGERS.
CLUTCH.
No. 360,393. Patented Mar. 29, 1887.
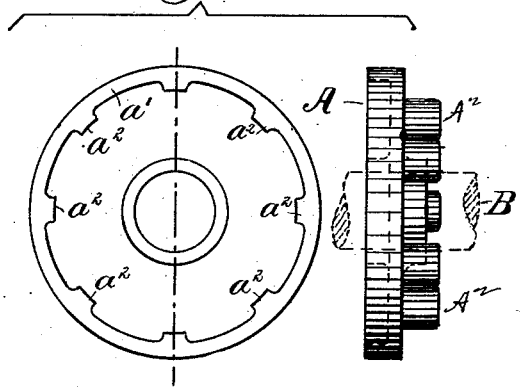
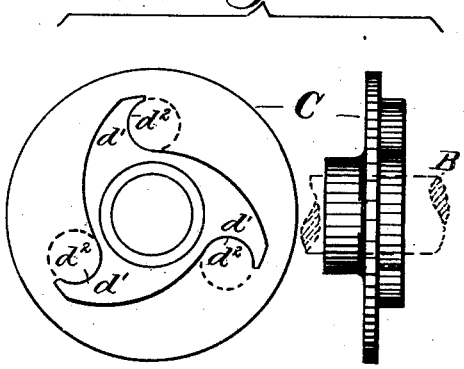
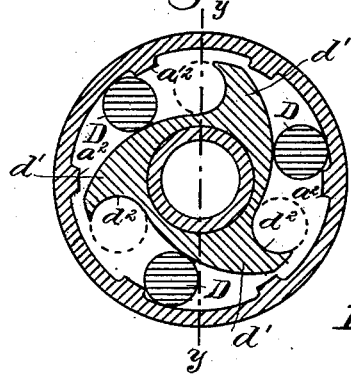
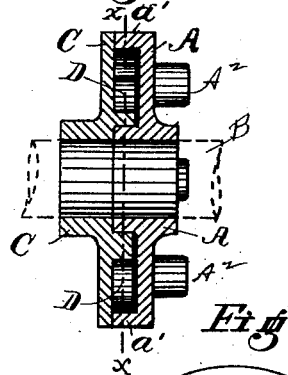
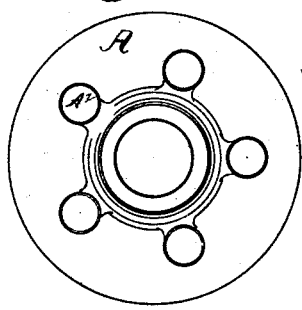
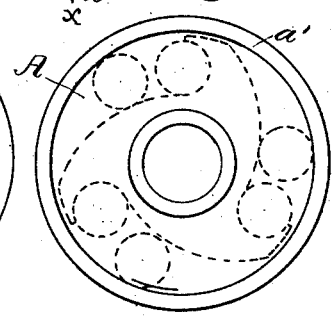
Witnesses:
R. H. Brandow.
G. C. Bowlus.
Inventor.
Timothy Rogers.
by N. C. Whitney
Atty

UNITED STATES PATENT OFFICE.

TIMOTHY ROGERS, OF SPRINGFIELD, OHIO, ASSIGNOR TO THE HANIKA IRON FENCE COMPANY, OF SAME PLACE.

CLUTCH.

SPECIFICATION forming part of Letters Patent No. 360,393, dated March 29, 1887.

Application filed November 23, 1886. Serial No. 219,587. (No model.)

*To all whom it may concern:*

Be it known that I, TIMOTHY ROGERS, of the city of Springfield, county of Clark, and State of Ohio, have invented certain new and useful Improvements in Clutches, of which the following is a specification.

My invention relates to clutches, and is intended as an improvement upon that class known as "friction-clutches," the object of the invention being to produce a cheap and durable clutch device which will under all circumstances be positive in its operation.

My invention consists in a clutch comprising a disk-like clutch-half having a series of radially-arranged ratchet-teeth upon its face, a casing or clutch-half therefor having a series of teeth upon its outer face, and a series of cylindrical disks loosely held between the ratchet-teeth and the wall of the casing, all substantially as hereinafter described, and pointed out in the claim.

My invention also consists in certain details of construction and in the combination of the parts of the clutch, substantially as hereinafter described.

Figure 1 shows details of the pinion or casing which forms the loose member or half of the clutch, said figure showing a front and edge view of the same; Fig. 2, a front and edge view of the fixed member or clutch-half; Fig. 3, a central longitudinal section of the clutch on dotted line $x\,x$, Fig. 4, the disks being shown in two positions, the dotted lines showing the normal or inoperative position and the full lines showing them in operative position; Fig. 4, a central cross-section of the clutch on dotted line $y\,y$, Fig. 3; Fig. 5, a front view of the pinion or loose clutch-half, showing the teeth thereon; and Fig. 6, a front view of a modified form of casing or pinion.

My improved clutch is herein shown as constructed in five pieces—viz., the peripherally-flanged clutch-half A, which is loosely mounted upon the shaft B, (shown in dotted lines,) the ratchet-toothed clutch-half C, which is fixed to the shaft B in the usual manner, and the three gravity-disks D, which are interposed between the edges of the ratchet-teeth on the fixed clutch-half and the rim of the loose clutch-half.

The clutch-half A, which may be provided with cogs or teeth of any desired construction, will be constructed of cast metal and be cored out to form a flanged rim, $a'$, upon the inner face of which rim is formed a series of projections, $a^2$, as clearly shown in Figs. 1 and 3. This clutch-half is mounted loosely upon the shaft, and will be held in place against longitudinal movement in any suitable manner.

The clutch-half C, which is fixed to the shaft, as before stated, will be constructed of cast metal, and preferably of the shape illustrated in the drawings. This clutch-half C has a series (preferably three) of radiating ratchet-teeth, $d'$, formed upon its inner face, which teeth will preferably be scroll-shaped and cored out at their ends to form semicircular sockets $d^2$ at their ends nearest the edge of the clutch-half, as illustrated, said semicircular portion of the ratchet-teeth being of sufficient area to receive and hold a disk or roller, D.

When in position upon the shaft, the flange $a'$ upon the loose clutch-half A incases the teeth upon the fixed clutch-half and the gravity-disks D rest between the flange $a'$ and the teeth. These disks, during the revolution of the loose clutch-half A in one direction, will be impinged between the flange $a'$ of clutch-half A and the faces of the ratchet-teeth $d'$ of the clutch-half C, which is fixed to the shaft, and carry the clutch-half C and shaft forward, and during the revolution of the loose clutch-half in the opposite direction the disks D, by their own gravitation, roll backward into the sockets $d^2$ of the teeth $d'$ and remain inactive, the elongated projections $a^2$, formed upon the inner face of the flange $a'$, being engaged by the gravity-disks D during the revolution of the clutch-halves, which prevents slippage.

The projections $a^2$, formed upon the interior of the flange $a'$ of the loose clutch-half A, will, as the fixed clutch-half is revolved in one direction, engage the gravity-disks and prevent any possibility of their slipping, and thus becoming inoperative.

It is obvious that the ratchet-teeth might be formed upon the loose clutch-half A and the flange $a'$ be formed upon the fixed clutch-half and equally good results be obtained. Therefore I do not desire to limit myself to the special construction, separately, of either of the clutch-halves.

It will be noticed by reference to the drawings that the loose clutch-half A is provided upon its outer face with a series of cogs or teeth, $A^2$, thereby forming a pinion, the cogs meshing with the teeth of a spur-wheel which drives it—as, for instance, when used with a lawn-mower.

I claim—

The combination, in a clutch, of the clutch-half C, secured to the shaft and having the radiating ratchet-teeth $d'$ formed upon its face, the loose clutch-half A, having the annular flange $a'$ formed upon its inner face, with a series of elongated projections, $a^2$, formed upon the inner face of said flange $a'$, and the disks or rollers loosely contained between the acting faces of the teeth and the inner face of the flange $a'$ and projections $a^2$ of the clutch-half A, substantially as and for the purpose set forth.

In witness whereof I have hereunto set my hand and seal, at Springfield, Ohio, this 3d day of November, A. D. 1886.

TIMOTHY ROGERS. [L. S.]

In presence of—
N. E. C. WHITNEY,
P. J. CLEVENGER.